(12) United States Patent
Kaneko

(10) Patent No.: US 9,530,188 B2
(45) Date of Patent: Dec. 27, 2016

(54) IMAGE PROCESSING METHOD, IMAGE PROCESSING SYSTEM, AND IMAGE PROCESSING PROGRAM

(75) Inventor: Eiji Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 216 days.

(21) Appl. No.: 13/995,399

(22) PCT Filed: Dec. 20, 2011

(86) PCT No.: PCT/JP2011/079557
§ 371 (c)(1),
(2), (4) Date: Jun. 18, 2013

(87) PCT Pub. No.: WO2012/086658
PCT Pub. Date: Jun. 28, 2012

(65) Prior Publication Data
US 2013/0266221 A1      Oct. 10, 2013

(30) Foreign Application Priority Data
Dec. 24, 2010   (JP) .................................. 2010-287246

(51) Int. Cl.
*G06T 5/00* (2006.01)
*G06T 15/50* (2011.01)

(52) U.S. Cl.
CPC ............... *G06T 5/00* (2013.01); *G06T 15/506* (2013.01); *G06T 2215/16* (2013.01)

(58) Field of Classification Search
CPC ...... G06T 15/50; G06T 15/503; G06T 15/506; G06T 15/60; G06T 15/80; G06T 15/83; G06T 15/87
USPC ........................................................ 345/426
See application file for complete search history.

(56) References Cited

U.S. PATENT DOCUMENTS 5,485,556 A * 1/1996 Takagi et al. ................. 345/426
5,572,635 A * 11/1996 Takizawa et al. ............ 345/426

FOREIGN PATENT DOCUMENTS

| JP | 04-358291 A | 12/1992 |
|----|-------------|---------|
| JP | 08-122157 A | 5/1996 |
| JP | 2806003 B2 | 9/1998 |
| JP | 2003-224867 A | 8/2003 |
| JP | 2008-225887 A | 9/2008 |

OTHER PUBLICATIONS

Debevec et al., Estimating Surface Reflectance Properties of a Complex Scene under Captured Natural Illumination, USC ICT Technical Report ICT-TR-06.2004.*
Chandra et al., Aerial Image Relighting: Simulating Time of Day Variations, CGI'06 Proceedings of the 24th international conference on Advances in Computer Graphics pp. 594-605.*
Insolation, website url: http://www.geog.ucsb.edu/ideas/Insolation.html, wayback machine url: http://web.archive.org/web/20101127185116/http://www.geog.ucsb.edu/ideas/Insolation.html.*

(Continued)

*Primary Examiner* — Jacinta M Crawford
*Assistant Examiner* — Phuc Doan
(74) *Attorney, Agent, or Firm* — Sughrue Mion, PLLC

(57) ABSTRACT

The present invention relates to an illumination spectrum estimation method in which an illumination spectrum is calculated on the basis of weather information.

12 Claims, 7 Drawing Sheets

(56) References Cited

OTHER PUBLICATIONS nrel, Shining on Chapter 4, url: http://rredc.nrel.gov/solar/pubs/shining/chap4.html, 2001.*

Lalonde, Estimating the Natural Illumination Conditions from a Single outdoor image, Oct. 2009, International Conference on Computer Vision (ICCV).*

Kazufumi Kaneda, et al., "A Fast Accurate Rendering Method of Outdoor Scenes Using an All-weather Skylight Model", The Journal of the Institute of Image Electronics Engineers of Jappan, ISSN:0285-9831, Aug. 25, 1999, pp. 349-357, vol. 28, No. 4.

Kazufumi Kaneda, et al., "Photorealistic image synthesis for outdoor scenery under various atmospheric conditions", The Visual Computer, 1991, pp. 247-258, vol. 7, Nos. 5/6.

Richard E. Bird, et al., "Simple Solar Spectral Model for Direct and Diffuse Irradiance on Horizontal and Tilted Planes at the Earth's Surface for Cloudless Atmospheres", Journal of Climate and Applied Meteorology, Jan. 1986, pp. 87-97, vol. 25.

International Search Report for PCT/JP2011/079557, dated Jan. 31, 2012.

Communication dated Feb. 10, 2016 from the Japanese Patent Office in counterpart application No. 2012-549840.

* cited by examiner

# IMAGE PROCESSING METHOD, IMAGE PROCESSING SYSTEM, AND IMAGE PROCESSING PROGRAM

CROSS REFERENCE TO RELATED APPLICATIONS

This application is a National Stage of International Application No. PCT/JP2011/079557 filed Dec. 20, 2011, claiming priority based on Japanese Patent Application No. 2010-287246 filed Dec. 24, 2010, the contents of all of which are incorporated herein by reference in their entirety.

TECHNICAL FIELD

The present invention relates to an image processing method, an image processing system, and an image processing program.

BACKGROUND ART

Colors of an image captured using an imaging apparatus are generated based on light from environmental illumination light during imaging reflected off a surface of a subject and impinging upon the imaging apparatus. Accordingly, colors of a captured image vary with different environmental illumination light even when a subject having the same surface reflectance is imaged. In techniques of recognizing an object in an image using a hyperspectral image in which light of a large number of wavelengths is recorded, it is undesirable that a captured spectrum vary with a change of environmental illumination light in spite of the fact that the subject is the same object. To solve the problem, it is necessary to estimate an optical spectrum of environmental illumination light and correct an effect thereof.

A method of correcting an effect of variation of an optical spectrum of environmental illumination light has been already proposed, which involves estimating a color temperature of environmental illumination light for a captured color image represented by three channels of RGB, and correcting the image from the estimated color temperature (see PTLs 1 and 2).

In PTL 1, for example, color information for gray and/or skin color contained in an image is used to estimate a color temperature of environmental illumination light, and a rate of correction for converting the temperature to a target color temperature is calculated for each channel to correct the image.

In PTL 2, the color temperature that minimizes an evaluation value calculated from a spectral energy distribution of blackbody radiation and an eigenvector of a subject is estimated as the color temperature of an imaging light source. To apply these techniques to a hyperspectral image, a rate of correction for each wavelength may be calculated using an optical spectrum of environmental illumination light generated from the estimated color temperature and an optical spectrum in the target environment. Specifically, representing an optical spectrum intensity of a certain pixel in an input captured image at a wavelength λ as $L(\lambda)$, an estimated illumination spectrum intensity during imaging as $I(\lambda)$, and a target illumination spectrum intensity as $I'(\lambda)$, an optical spectrum intensity $L'(\lambda)$ for that pixel in an output image can be calculated as given by EQ. (1):

[EQ. 1]

$$L'(\lambda) = \frac{I'(\lambda)}{I(\lambda)} \cdot L(\lambda) \quad \text{(EQ. 1)}$$

Although these methods effectively work for color images, they pose a problem that correction for hyperspectral images is insufficient because there is a large error between the optical spectrum generated from the color temperature and that of actual environmental illumination light.

When the imaging environment is limited to the outdoors, an optical spectrum of environmental illumination light that is main there is a spectrum of insolation from sunlight observed on the ground surface. A method of estimating a spectrum of insolation under clear skies with high accuracy is proposed in NPL 1.

The method of estimating an optical spectrum in NPL 1 estimates attenuation or scatter of sunrays in the atmosphere and incidence thereof to the subject surface based on insolation conditions during imaging calculated from the date and time and place information, such as the solar zenith angle, atmospheric turbidity or precipitable water, and information on tilt of the subject surface to calculate a direct component Id, which is insolation equivalent to so-called direct sunrays onto the subject surface, and a scatter component Is, which represents environmental light, and calculates their sum as an insolation spectrum I. Accordingly, this method can estimate environmental illumination light in the outdoors under clear skies with high accuracy.

A diagram of a configuration of the image processing method in accordance with the techniques in the related art described above is shown in FIG. 12. The diagram of the configuration in FIG. 12 is a block diagram generated based on PTLs 1 and 2, and NPL 1. Clear-sky illumination spectrum calculating means 12 receives an input of insolation conditions during imaging, and uses the method of calculation according to NPL 1 to calculate an illumination spectrum during imaging under clear skies.

Illumination spectrum correcting means 11 receives inputs of an input image captured outdoors, the illumination spectrum during imaging estimated by the clear-sky illumination spectrum calculating means 12, and a target illumination spectrum stored in a target illumination spectrum storage memory 13, and uses the method according to EQ. (1) to convert the input image into an image as captured under the target illumination spectrum.

CITATION LIST

Patent Literature

PTL 1: JP P2003-224867A
PTL 2: JP P1996-122157A

Non Patent Literature

NPL 1: Bird, R. E., and C. Riordan, Simple Solar Spectral Model for Direct and Diffuse Irradiance on Horizontal and Tilted Planes at the Earth's Surface for Cloudless Atmospheres, Technical Report No. SERI/TR-215-2436, Golden, Colo.: Solar Energy Research Institute, 1984

SUMMARY OF INVENTION

Technical Problem

While the techniques in the related art described above are capable of calculating an illumination spectrum that varies according to insolation conditions, such as the date and time, and place, during imaging, and converting an image captured outdoors under clear skies into an image as captured under a target illumination, they pose a problem that they cannot calculate an illumination spectrum that varies according to weather during imaging.

Thus, the present invention has been made in view of such problems, and its object is to provide an image processing method, an image processing system, and an image processing program for correcting an image so that captured color information can be used as stable information even when the image is captured under a cloudy or shaded environment, as well as under a clear-sky environment.

Solution to Problem

The present invention is a method of estimating an illumination spectrum, comprising: calculating an illumination spectrum based on weather information.

The present invention is an image processing method of converting an image captured outdoors in arbitrary date and time, place, and weather into an image as captured under a specified illumination spectrum, comprising: direct/scatter component calculating step of calculating direct and scatter components in an illumination spectrum under clear skies based on insolation conditions during imaging; imaging illumination spectrum calculating step of combining said direct component with said scatter component based on information on weather during imaging, and estimating an illumination spectrum in an imaging environment; and illumination spectrum correcting step of converting an input image into an image as under predefined illumination.

The present invention is an image processing method of converting an image captured under known illumination into an image as captured outdoors in arbitrary date and time, place, and weather specified by a user, comprising: direct/scatter component calculating step of calculating direct and scatter components in an illumination spectrum under clear skies based on specified insolation conditions; target illumination spectrum calculating step of combining said direct component with said scatter component based on the specified weather information, and calculating an illumination spectrum in a target environment; and illumination spectrum correcting step of converting an input image into an image as under illumination in said target environment.

The present invention is an image processing method of converting an image captured outdoors in arbitrary date and time, place, and weather into an image as captured outdoors in different arbitrary date and time, place, and weather, comprising: direct/scatter component calculating step of calculating direct and scatter components in an illumination spectrum under clear skies based on insolation conditions during imaging; imaging illumination spectrum calculating step of combining said direct component with said scatter component based on information on weather during imaging, and estimating an illumination spectrum in an imaging environment; direct/scatter component calculating step of calculating direct and scatter components in an illumination spectrum under clear skies based on insolation conditions such as specified date and time and position; target illumination spectrum calculating step of combining said direct component with said scatter component based on specified weather information, and calculating an illumination spectrum in a target environment; and illumination spectrum correcting step of using the illumination spectrum in said imaging environment to convert an input image into an image as under illumination in said target environment.

The present invention is an image processing method of estimating spectral reflectance for an imaged object from an image captured outdoors in arbitrary date and time, place, and weather, comprising: direct/scatter component calculating step of calculating direct and scatter components in an illumination spectrum under clear skies based on insolation conditions during imaging; imaging illumination spectrum calculating step of combining said direct component with said scatter component based on information on weather during imaging, and estimating an illumination spectrum in an imaging environment; and spectral reflectance calculating step of removing an effect of the illumination spectrum in said imaging environment from an input image, and estimating spectral reflectance for the imaged object.

The present invention is an image processing method of generating an image captured outdoors in arbitrary date and time, place, and weather specified by a user from spectral reflectance data for an imaged object, comprising: direct/scatter component calculating step of calculating direct and scatter components in an illumination spectrum under clear skies based on specified insolation conditions; target illumination spectrum calculating step of combining said direct component with said scatter component based on specified weather information, and calculating an illumination spectrum in a target environment; and target spectrum image calculating step of generating an image under illumination in said target environment from the spectral reflectance data for the imaged object.

The present invention is an image processing system for converting an image captured outdoors in arbitrary date and time, place, and weather into an image as captured under a specified illumination spectrum, comprising: direct/scatter component calculating means for calculating direct and scatter components in an illumination spectrum under clear skies based on insolation conditions during imaging; imaging illumination spectrum calculating means for combining said direct component with said scatter component based on information on weather during imaging, and estimating an illumination spectrum in an imaging environment; and illumination spectrum correcting means for converting an input image into an image as under predefined illumination.

The present invention is an image processing system for converting an image captured under known illumination into an image as captured outdoors in arbitrary date and time, place, and weather specified by a user, comprising: direct/scatter component calculating means for calculating direct and scatter components in an illumination spectrum under clear skies based on specified insolation conditions; target illumination spectrum calculating means for combining said direct component with said scatter component based on the specified weather information, and calculating an illumination spectrum in a target environment; and illumination spectrum correcting means for converting an input image into an image as under illumination in said target environment.

The present invention is an image processing system for converting an image captured outdoors in arbitrary date and time, place, and weather into an image as captured outdoors in different arbitrary date and time, place, and weather, comprising: direct/scatter component calculating means for calculating direct and scatter components in an illumination spectrum under clear skies based on insolation conditions during imaging; imaging illumination spectrum calculating means for combining said direct component with said scatter component based on information on weather during imaging, and estimating an illumination spectrum in an imaging environment; direct/scatter component calculating means for calculating direct and scatter components in an illumination spectrum under clear skies based on insolation conditions such as specified date and time and position; target illumination spectrum calculating means for combining said direct component with said scatter component based on specified weather information, and calculating an illumination spectrum in a target environment; and illumination spectrum correcting means for converting an input image into an image as under illumination in said target environment by using the illumination spectrum in said imaging environment.

The present invention is an image processing system for estimating spectral reflectance for an imaged object from an image captured outdoors in arbitrary date and time, place, and weather, comprising: direct/scatter component calculating means for calculating direct and scatter components in an illumination spectrum under clear skies based on insolation conditions during imaging; imaging illumination spectrum calculating means for combining said direct component with said scatter component based on information on weather during imaging, and estimating an illumination spectrum in an imaging environment; and spectral reflectance calculating means for removing an effect of the illumination spectrum in said imaging environment from an input image, and estimating spectral reflectance for the imaged object.

The present invention is an image processing system for generating an image captured outdoors in arbitrary date and time, place, and weather specified by a user from spectral reflectance data for an imaged object, comprising: direct/scatter component calculating means for calculating direct and scatter components in an illumination spectrum under clear skies based on specified insolation conditions; target illumination spectrum calculating means for combining said direct component with said scatter component based on specified weather information, and calculating an illumination spectrum in a target environment; and target spectrum image calculating means for generating an image under illumination in said target environment from the spectral reflectance data for the imaged object.

The present invention is a program of converting an image captured outdoors in arbitrary date and time, place, and weather into an image as captured under a specified illumination spectrum, said program causing an information processing device to execute the processes of: direct/scatter component calculating processes of calculating direct and scatter components in an illumination spectrum under clear skies based on insolation conditions during imaging; imaging illumination spectrum calculating processes of combining said direct component with said scatter component based on information on weather during imaging, and estimating an illumination spectrum in an imaging environment; and illumination spectrum correcting processes of converting an input image into an image as under predefined illumination.

The present invention is a program of converting an image captured under known illumination into an image as captured outdoors in arbitrary date and time, place, and weather specified by a user, said program causing an information processing device to execute the processes of: direct/scatter component calculating processes of calculating direct and scatter components in an illumination spectrum under clear skies based on specified insolation conditions; target illumination spectrum calculating processes of combining said direct component with said scatter component based on the specified weather information, and calculating an illumination spectrum in a target environment; and illumination spectrum correcting processes of converting an input image into an image as under illumination in said target environment.

The present invention is a program of converting an image captured outdoors in arbitrary date and time, place, and weather into an image as captured outdoors in different arbitrary date and time, place, and weather, said program causing an information processing device to execute the processes of: direct/scatter component calculating processes of calculating direct and scatter components in an illumination spectrum under clear skies based on insolation conditions during imaging; imaging illumination spectrum calculating processes of combining said direct component with said scatter component based on information on weather during imaging, and estimating an illumination spectrum in an imaging environment; direct/scatter component calculating processes of calculating direct and scatter components in an illumination spectrum under clear skies based on insolation conditions such as specified date and time and position; target illumination spectrum calculating processes of combining said direct component with said scatter component based on specified weather information, and calculating an illumination spectrum in a target environment; and illumination spectrum correcting processes of using the illumination spectrum in said imaging environment to convert an input image into an image as under illumination in said target environment.

The present invention is a program of estimating spectral reflectance for an imaged object from an image captured outdoors in arbitrary date and time, place, and weather, said program causing an information processing device to execute the processes of: direct/scatter component calculating processes of calculating direct and scatter components in an illumination spectrum under clear skies based on insolation conditions during imaging; imaging illumination spectrum calculating processes of combining said direct component with said scatter component based on information on weather during imaging, and estimating an illumination spectrum in an imaging environment; and spectral reflectance calculating processes of removing an effect of the illumination spectrum in said imaging environment from an input image, and estimating spectral reflectance for the imaged object.

The present invention is a program of generating an image captured outdoors in arbitrary date and time, place, and weather specified by a user from spectral reflectance data for an imaged object, said program causing an information processing device to execute the processes of: direct/scatter component calculating processes of calculating direct and scatter components in an illumination spectrum under clear skies based on specified insolation conditions; target illumination spectrum calculating processes of combining said direct component with said scatter component based on specified weather information, and calculating an illumination spectrum in a target environment; and target spectrum image calculating processes of generating an image under illumination in said target environment from the spectral reflectance data for the imaged object.

Advantageous Effects of Invention

According to the present invention, an illumination spectrum can be estimated with high accuracy.

DESCRIPTION OF EMBODIMENTS

Now several embodiments of the present invention will be described in detail with reference to the accompanying drawings.

[First Embodiment]

Figure 1:
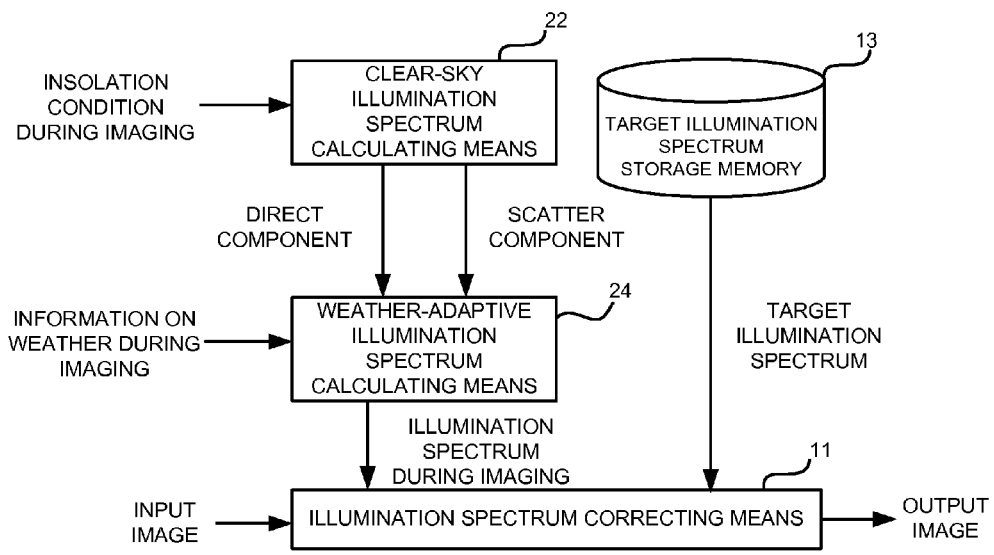
FIG. 1 is a diagram of a configuration of a first embodiment in accordance with the present invention.

FIG. 1 is a block diagram showing a configuration of a first embodiment in accordance with the present invention.

The first embodiment shown in FIG. 1 comprises illumination spectrum correcting means 11, clear-sky illumination spectrum calculating means 22, a target illumination spectrum storage memory 13, and weather-adaptive illumination spectrum calculating means 24, and it uses an input image captured outdoors, insolation conditions during imaging, and information on weather during imaging to generate as an output image an image in which illumination in the input image is corrected to have a target illumination spectrum.

The first embodiment in accordance with the present invention may be used to convert an image captured outdoors in arbitrary date and time, place, and weather into an image as captured under a target illumination spectrum.

As compared with the configuration of the techniques in the related art described earlier, the first embodiment in accordance with the present invention is different therefrom in the operation of the clear-sky illumination spectrum calculating means 22 and weather-adaptive illumination spectrum calculating means 24. The operation of the clear-sky illumination spectrum calculating means 22 and weather-adaptive illumination spectrum calculating means 24 will be described in detail hereinbelow.

Figure 12:
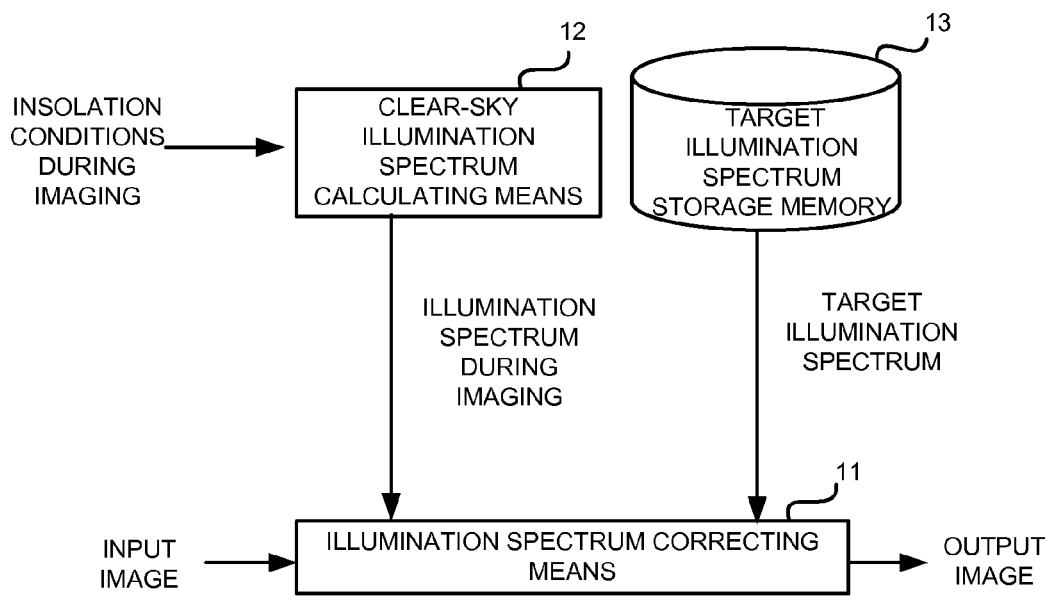
FIG. 12 is a diagram of a configuration of a method for correcting environmental illumination light in the techniques in the related art.

Similarly to the clear-sky illumination spectrum calculating means 12 in FIG. 12, the clear-sky illumination spectrum calculating means 22 receives an input of insolation conditions during imaging, and uses the method of calculation according to NPL 1 to calculate an illumination spectrum under clear skies. The clear-sky illumination spectrum calculating means 22, however, is different from the clear-sky illumination spectrum calculating means 12 in that the means 22 outputs a direct component Id and a scatter component Is determined in the process of the calculation.

The weather-adaptive illumination spectrum calculating means 24 receives inputs of the direct component, scatter component, and information on weather during imaging, and outputs an illumination spectrum during imaging. Since the techniques in the related art do not take account of scatter/penetration of light by clouds, they cannot generate an illumination spectrum during imaging with high accuracy in environments other than under clear skies. Thus, the weather-adaptive illumination spectrum calculating means 24 generates a highly accurate illumination spectrum during imaging even in environments other than under clear skies by predicting scatter/penetration of light by clouds or other objects from the input information on weather during imaging.

A principle of a method of generating an illumination spectrum during imaging in the first embodiment will be described hereinbelow.

Figure 13:
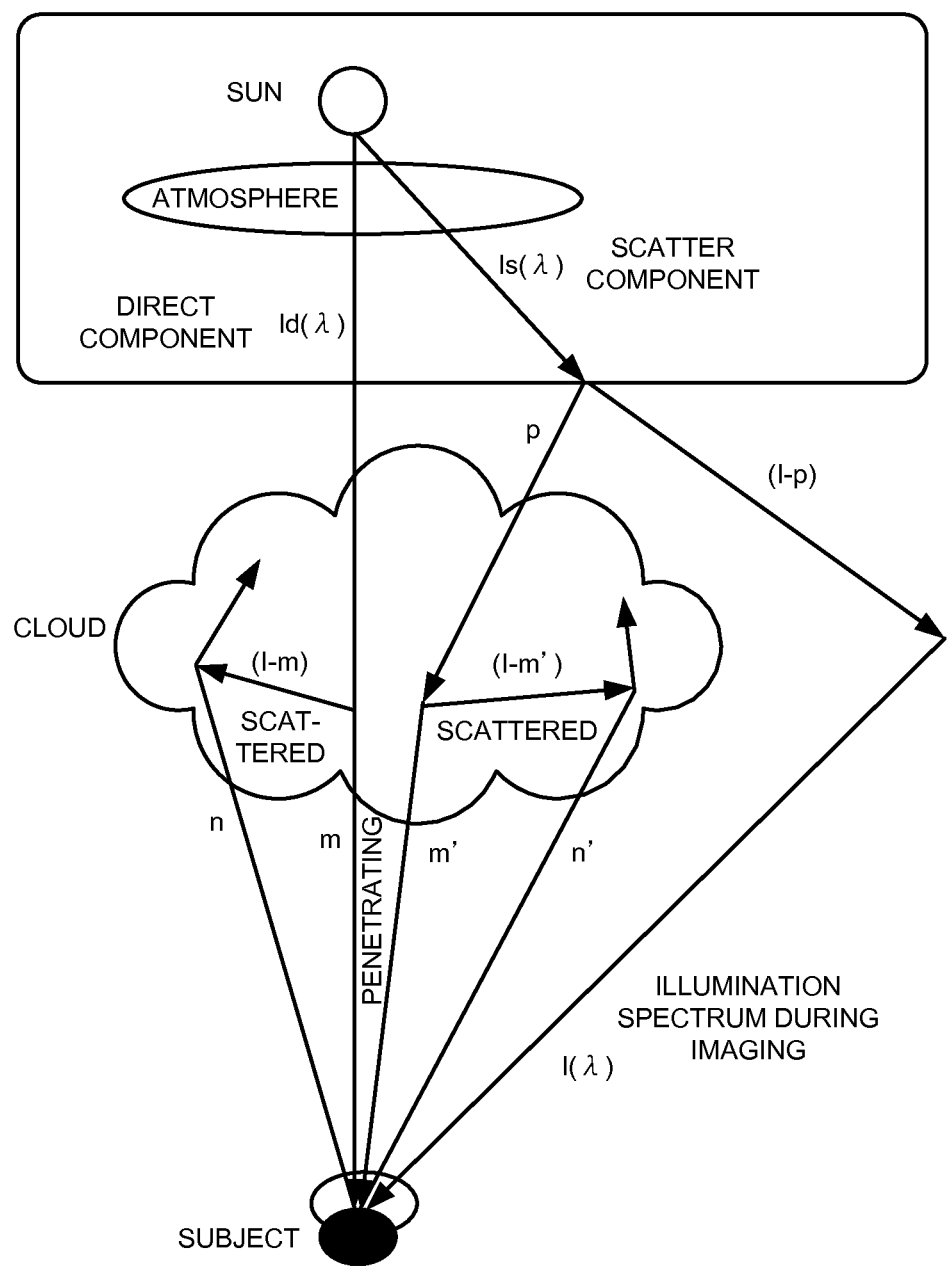
FIG. 13 is a diagram of a model representing transmission of illumination light in the outdoors under cloudy skies to a subject.

FIG. 13 is a diagram of a model representing transmission of sunlight to a subject in the outdoors under cloudy skies.

In the present model, first, direct and scatter components of light of sunlight traveling toward the subject before penetrating into a cloud are considered as a direct component Id and a scatter component Is, respectively, which are calculated in the process of the calculation in the method of calculation according to NPL 1.

Next, penetration and scatter of light when the light of the direct and scatter components passes through the cloud are calculated to calculate an illumination spectrum during imaging I that impinges upon the subject in an environment containing a cloud. Assuming that the penetration and scatter of light by a cloud are independent of a wavelength, an intensity of an illumination spectrum during imaging $I(\lambda)$ at a wavelength $\lambda$, which is incident to the subject in an environment containing a cloud, is calculated according to EQ. (2) using a proportion of light that passes through a cloud to light of the scatter component as p, proportions of light of the direct and scatter components passing through the cloud as m, m', respectively, and proportions of light scattered by the cloud and then impinging upon the subject again as n, n', respectively. In the equation, $Id(\lambda)$ and $Is(\lambda)$ represent the spectrum intensity of the direct and scatter components, respectively, at a wavelength $\lambda$.

[EQ. 2]

$$I(\lambda)=\{n(1-m)+m\}\cdot Id(\lambda)+[(1-p)+p\{n'(1-m')+m'\}]\cdot Is(\lambda) \quad (EQ. 2)$$

Since coefficient terms for $Id(\lambda)$ and $Is(\lambda)$ in the right side of EQ. (2) are constants, the spectral shape of the illumination spectrum during imaging I is dependent only on a ratio between the coefficient term for $Id(\lambda)$ and that for $Is(\lambda)$. Thus, by using a combination weight $\alpha$ to combine the direct component Id at a combination rate of $\alpha$ with the scatter component Is at a combination rate of $1-\alpha$, a resulting combined sum can express all spectral shapes that the illumination spectrum during imaging I may take. Specifically, the illumination spectrum during imaging $I(\lambda)$ can be given as EQ. (3) as a proportional formula at a wavelength $\lambda$:

[EQ. 3]

$$I(\lambda)\propto\alpha\cdot Id(\lambda)+(1-\alpha)\cdot Is(\lambda) \quad (EQ. 3)$$

By using EQ. (3), a spectral shape of the illumination spectrum during imaging I can be calculated. For example, in an image captured in a "shaded" environment in which a direct component is blocked by an object, the direct component is blocked and only the scatter component strikes the subject, so that a combination weight α of zero may be used to calculate a spectral shape of the illumination spectrum during imaging I. In an image captured in a "clear-sky" environment having no block of sunlight by a cloud or an object, the same assumption as that in NPL 1 may apply, and a combination weight α of 0.5 may be used to calculate a spectral shape of the illumination spectrum during imaging I. In a "cloudy" environment in which the sun is blocked by clouds, part of the direct component is mixed with the scatter component due to scatter of light within a cloud and strikes the subject as scattered light. In other words, a direct component reaching the subject is present, and this is different from the shaded environment in which the direct component is completely blocked. Therefore, in an image captured in the "cloudy" environment, a combination weight α of a non-zero real value up to 0.5, such as 0.2 or 0.3, may be set to calculate a spectral shape of the illumination spectrum during imaging I.

Figure 2:
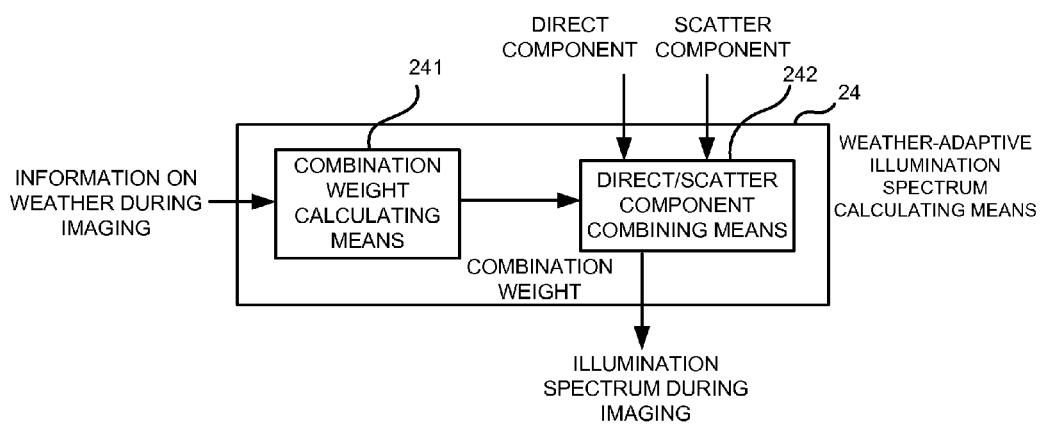
FIG. 2 is a diagram of a detailed configuration of weather-adaptive illumination spectrum calculating means 24 in FIG. 1.

Next, a block diagram representing a configuration of the weather-adaptive illumination spectrum calculating means 24 is shown in FIG. 2.

The weather-adaptive illumination spectrum calculating means 24 comprises combination weight calculating means 241 and direct/scatter component combining means 242, and receives inputs of direct and scatter components and information on weather during imaging and outputs an illumination spectrum during imaging.

The combination weight calculating means 241 receives an input of the information on weather during imaging, and calculates and outputs a combination weight α for direct and scatter components for generating an illumination spectrum during imaging.

A method of inputting the information on weather during imaging may comprise, for example, allowing a user to select from among preset options, such as "clear-sky", "cloudy", and "shaded", according to weather conditions during imaging.

A method of calculating a combination weight α may comprise setting values of the combination weight α corresponding to the preset options beforehand in an internal memory, and loading a value of the combination weight from the memory corresponding to an input selection. For example, the method sets the combination weight α to zero when "shaded" is selected, to 0.5 when "clear-sky" is selected, and when "cloudy" is selected, to a most suitable real value between 0.0 and 0.5, such as 0.2 or 0.3, according to a degree of cloudiness.

The direct/scatter component combining means 242 receives inputs of the combination weight α, and direct component Id and scatter component Is, and combines the direct component with the scatter component based on the input combination weight α as given by EQ. (3), to generate an illumination spectrum during imaging I.

Figure 3:
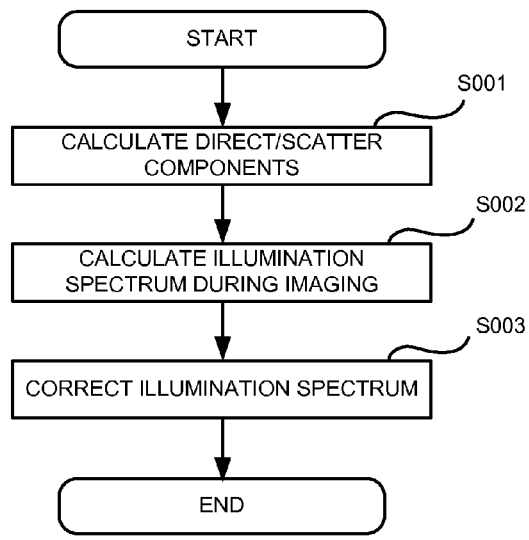
FIG. 3 is a flow chart of the first embodiment in accordance with the present invention.

Next, an overall operation of the present embodiment will be described with reference to FIGS. 1, 2 and a flow chart in FIG. 3.

First, the clear-sky illumination spectrum calculating means 22 receives an input of insolation conditions during imaging, uses the method of calculation according to NPL 1 to calculate a direct component and a scatter component, and outputs them (S001).

The weather-adaptive illumination spectrum calculating means 24 receives inputs of the information on weather during imaging and direct and scatter components Id, Is, and combines the direct component with the scatter component based on a combination weight α calculated from the information on weather during imaging to generate an illumination spectrum during imaging (S002).

The illumination spectrum correcting means 11 converts an input image captured under arbitrary outdoor illumination into an image as captured under target illumination using the method of EQ. (1) based on the illumination spectrum during imaging estimated by the weather-adaptive illumination spectrum calculating means 24 and a target illumination spectrum retained in the target illumination spectrum storage memory 13 (S003).

While the first embodiment involves correcting an effect of variation of environmental illumination light on a spectrum during imaging in a hyperspectral image, it may be applied to an RGB image by correlating the number of sampled wavelengths in an imaging spectrum image with three channels of RGB. A method of applying it to an RGB image may comprise applying correction in which an illumination spectrum during imaging generated according to the present embodiment is replaced for that generated based on an estimated color temperature in PTL 1 or 2.

[Second Embodiment]

Figure 4:
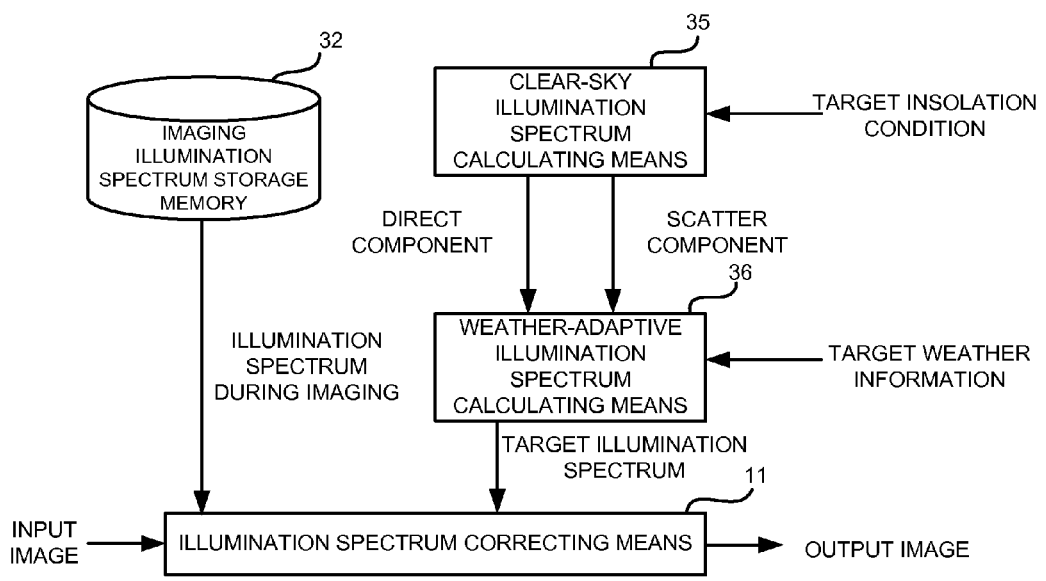
FIG. 4 is a diagram of a configuration of a second embodiment in accordance with the present invention.

FIG. 4 is a block diagram showing a configuration of a second embodiment in accordance with the present invention.

The second embodiment in accordance with the present invention shown in FIG. 4 comprises illumination spectrum correcting means 11, an imaging illumination spectrum storage memory 32, clear-sky illumination spectrum calculating means 35, and weather-adaptive illumination spectrum calculating means 36.

The second embodiment in accordance with the present invention converts an input image captured under known illumination into an image as captured under an arbitrary outdoor environment defined by target insolation conditions and target weather information. By using the second embodiment in accordance with the present invention, an image captured under known illumination, such as indoors under a fluorescent lamp, for example, may be converted into an image as captured outdoors in arbitrary date and time, place, and weather specified by a user.

As compared with the first embodiment, the second embodiment in accordance with the present invention is different therefrom in that an illumination spectrum during imaging is retained in the imaging illumination spectrum storage memory 32 beforehand, and that the target illumination spectrum is generated through the clear-sky illumination spectrum calculating means 35 and weather-adaptive illumination spectrum calculating means 36.

Now an operation of the clear-sky illumination spectrum calculating means 35 and weather-adaptive illumination spectrum calculating means 36 will be described in detail.

The clear-sky illumination spectrum calculating means 35 operates similarly to the clear-sky illumination spectrum calculating means 22 and outputs direct and scatter components; however, target insolation conditions, such as a date and time, a place, a solar zenith angle, an atmospheric turbidity, and a precipitable water, in place of the information on insolation during imaging, are input thereto as the target information on insolation.

The weather-adaptive illumination spectrum calculating means 36 operates similarly to the weather-adaptive illumination spectrum calculating means 24 in FIG. 1 and outputs a target illumination spectrum; however, target weather conditions, in place of the information on weather during imaging, are input as the target information on weather. For example, a method may comprise allowing a user to select from among preset options, such as "clear-sky", "cloudy", and "shaded", according to the target weather conditions.

Figure 5:
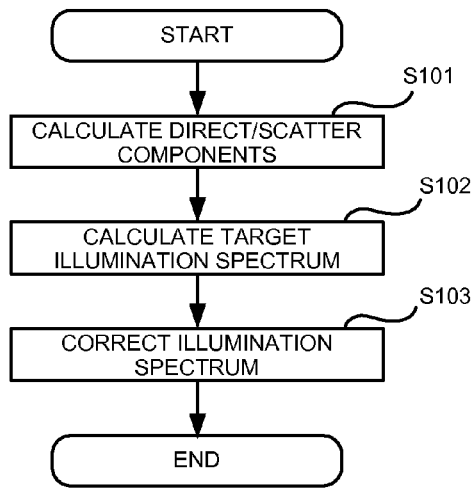
FIG. 5 is a flow chart of the second embodiment in accordance with the present invention.

Next, an overall operation of the present embodiment will be described with reference to FIG. 4 and a flow chart in FIG. 5.

The clear-sky illumination spectrum calculating means 35 generates direct and scatter components based on target information on insolation (S101).

The weather-adaptive illumination spectrum calculating means 36 generates a target illumination spectrum based on target information on weather (S 102).

The illumination spectrum correcting means 11 converts an input image captured under known illumination into an image as captured under arbitrary outdoor illumination using the method of EQ. (1) based on the illumination spectrum during imaging retained in the imaging illumination spectrum storage memory and the target illumination spectrum calculated by the weather-adaptive illumination spectrum calculating means, and outputs the resulting image (S103).

[Third Embodiment]

Figure 6:
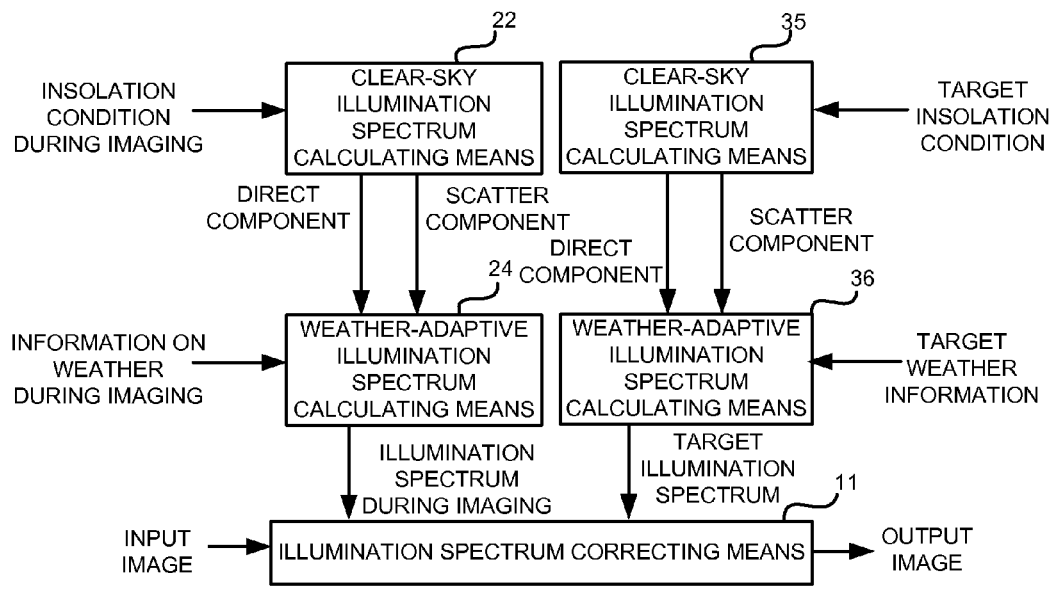
FIG. 6 is a diagram of a configuration of a third embodiment in accordance with the present invention.

FIG. 6 is a block diagram showing a configuration of a third embodiment in accordance with the present invention.

The third embodiment in accordance with the present invention shown in FIG. 6 comprises illumination spectrum correcting means 11, clear-sky illumination spectrum calculating means 22, weather-adaptive illumination spectrum calculating means 24, clear-sky illumination spectrum calculating means 35, and weather-adaptive illumination spectrum calculating means 36.

The third embodiment in accordance with the present invention converts an input image captured under an arbitrary outdoor environment defined by insolation conditions during imaging and information on weather during imaging, into an image as captured under a new arbitrary outdoor environment defined by target insolation conditions and target information on weather.

By using the third embodiment in accordance with the present invention, it is possible to convert an image captured outdoors in arbitrary date and time, place, and weather, for example, into an image as captured outdoors in different arbitrary date and time, place, and weather. This is useful in color-based object recognition when comparing an image captured outdoors in arbitrary date and time, place, and weather with an image in a database captured outdoors in different date and time, place, and weather.

As compared with the first embodiment, the third embodiment in accordance with the present invention is different therefrom in that the target illumination spectrum, which is retained in the target illumination spectrum storage memory in the first embodiment, is generated through the clear-sky illumination spectrum calculating means 35 and weather-adaptive illumination spectrum calculating means 36 in the second embodiment.

Figure 7:
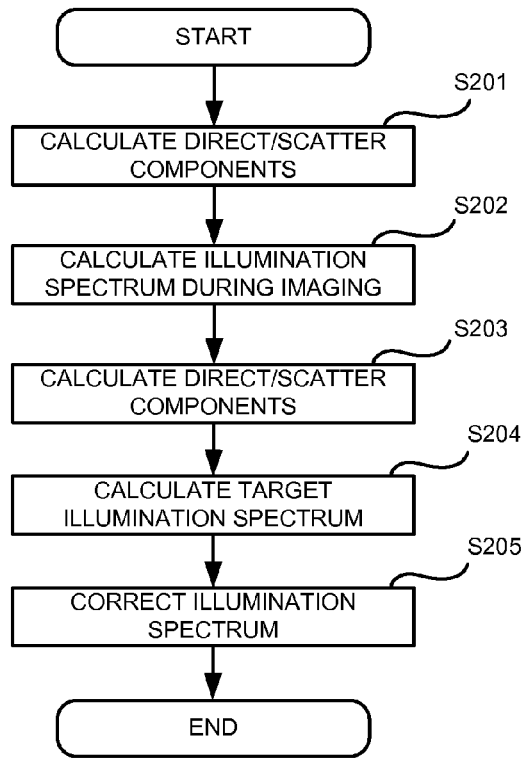
FIG. 7 is a flow chart of the third embodiment in accordance with the present invention.

Next, an overall operation of the present embodiment will be described with reference to FIG. 6 and a flow chart in FIG. 7.

The clear-sky illumination spectrum calculating means 22 receives an input of insolation conditions during imaging, and uses the method of calculation according to NPL 1 to output amounts of the combined direct and scatter insolation in an insolation spectrum, which are calculated in the process of the calculation as a direct component and a scatter component, respectively (S201).

The weather-adaptive illumination spectrum calculating means 24 receives inputs of information on weather during imaging and the direct and scatter components, and combines the direct component with the scatter component based on a combination weight calculated from the information on weather during imaging to generate a target illumination spectrum (S202).

The clear-sky illumination spectrum calculating means 35 generates direct and scatter components based on target information on insolation (S203).

The weather-adaptive illumination spectrum calculating means 36 generates a target illumination spectrum based on target information on weather (S204).

The illumination spectrum correcting means 11 converts an input image captured under an arbitrary outdoor environment into an image as captured under a new arbitrary outdoor environment using the method of EQ. (1) based on the illumination spectrum during imaging calculated at the weather-adaptive illumination spectrum calculating means 24 and the target illumination spectrum calculated at the weather-adaptive illumination spectrum calculating means 36, and outputs the resulting image (S205).

[Fourth Embodiment]

Figure 8:
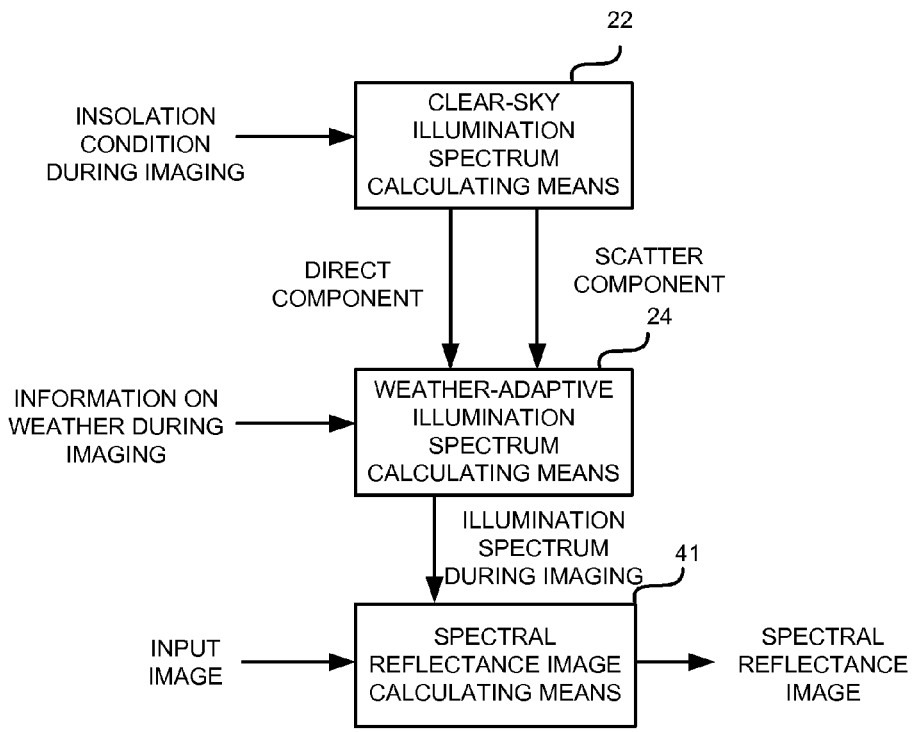
FIG. 8 is a diagram of a configuration of a fourth embodiment in accordance with the present invention.

FIG. 8 is a block diagram showing a configuration of a fourth embodiment in accordance with the present invention.

The fourth embodiment in accordance with the present invention shown in FIG. 8 comprises spectral reflectance calculating means 41, clear-sky illumination spectrum calculating means 22, and weather-adaptive illumination spectrum calculating means 24, and uses an input image captured outdoors, and insolation conditions during imaging and information on weather during imaging to generate as a spectral reflectance image an image in which an effect of illumination in an input image is removed.

By using the fourth embodiment in accordance with the present invention, it is possible to convert an image captured outdoors in arbitrary date and time, place, and weather, for example, into a spectral reflectance image. This is useful in color-based object recognition when creating a database of spectral reflectance images from captured images, or when converting an image in a captured scene into a spectral reflectance image and comparing it with a database of the spectral reflectance.

Now an operation of the spectral reflectance calculating means 41 will be described in detail.

The spectral reflectance calculating means 41 uses an input image and an illumination spectrum during imaging to generate as a spectral reflectance image an image in which an effect of illumination during imaging is removed from the input image. Representing an optical spectrum intensity of a certain pixel in an input image at a wavelength $\lambda$ as $L(\lambda)$, and an intensity of an illumination spectrum during imaging as $I(\lambda)$, an optical spectrum intensity $O(\lambda)$ recorded to a pixel corresponding to the input pixel in a spectral reflectance image is calculated as given by EQ. (4):

[EQ. 4]

$$O(\lambda) = \frac{L(\lambda)}{I(\lambda)} \qquad \text{(EQ. 4)}$$

Figure 9:
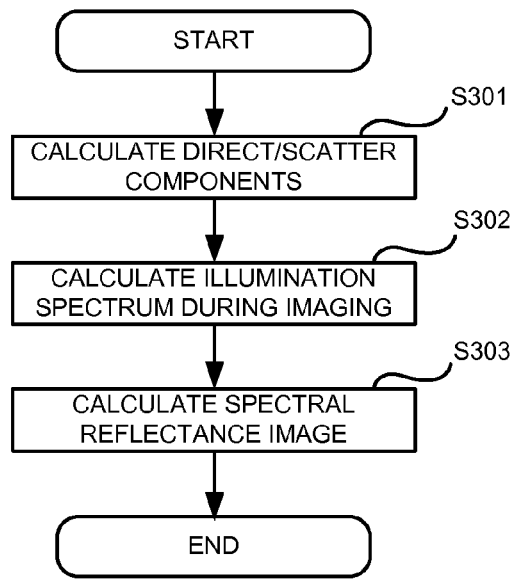
FIG. 9 is a flow chart of the fourth embodiment in accordance with the present invention.

Next, an overall operation of the present embodiment will be described with reference to FIG. 8 and a flow chart in FIG. 9.

The clear-sky illumination spectrum calculating means 22 receives an input of insolation conditions during imaging, and uses the method of calculation according to NPL 1 to output amounts of the combined direct and scatter insolation in an insolation spectrum, which are calculated in the process of the calculation as a direct component and a scatter component, respectively (S301).

The weather-adaptive illumination spectrum calculating means 24 receives inputs of information on weather during imaging and the direct and scatter components, and combines the direct component with the scatter component based on a combination weight calculated from the information on weather during imaging to generate a target illumination spectrum (S302).

The spectral reflectance image calculating means 41 converts the input image captured under arbitrary outdoor illumination into an image in which an effect of illumination is removed using the method of EQ. (4) based on the illumination spectrum during imaging calculated at the weather-adaptive illumination spectrum calculating means 24, and outputs the resulting image as a spectral reflectance image (S303).

[Fifth Embodiment]

Figure 10:
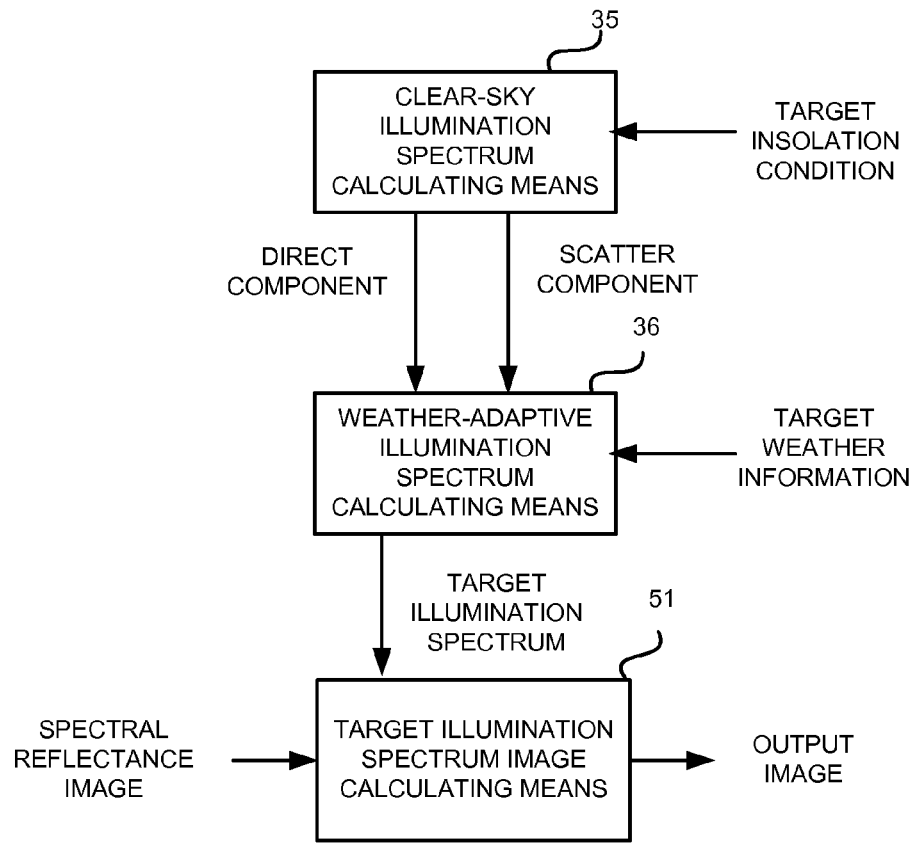
FIG. 10 is a diagram of a configuration of a fifth embodiment in accordance with the present invention.

FIG. 10 is a block diagram showing a configuration of a fifth embodiment in accordance with the present invention.

The fifth embodiment in accordance with the present invention shown in FIG. 10 comprises target illumination spectrum image calculating means 51, clear-sky illumination spectrum calculating means 35, and weather-adaptive illumination spectrum calculating means 36, and converts a spectral reflectance image, which is an image having an effect of an illumination spectrum during imaging removed, into an image as captured outdoors under a target illumination environment using the target insolation conditions and target information on weather. By using the fifth embodiment in accordance with the present invention, it is possible to convert a spectral reflectance image, for example, into an image as captured outdoors in arbitrary date and time, place, and weather specified by a user.

Now an operation of the target illumination spectrum image calculating means 51 will be described in detail.

The target illumination spectrum image calculating means 51 generates an image whose illumination spectrum is corrected to an illumination spectrum in the outdoors as an output image using a target illumination spectrum based on a spectral reflectance image, which is an image having an effect of an illumination spectrum during imaging removed. Representing an optical spectrum intensity recorded to a certain pixel in a spectral reflectance image at a wavelength $\lambda$ as $O(\lambda)$, and a target illumination spectrum intensity as $I'(\lambda)$, an optical spectrum intensity $L'(\lambda)$ for a pixel corresponding to the input pixel in an output image is calculated as given by EQ. (5):

[EQ. 5]

$$L'(\lambda)=O(\lambda)\cdot I'(\lambda) \quad (EQ. 5)$$

Figure 11:
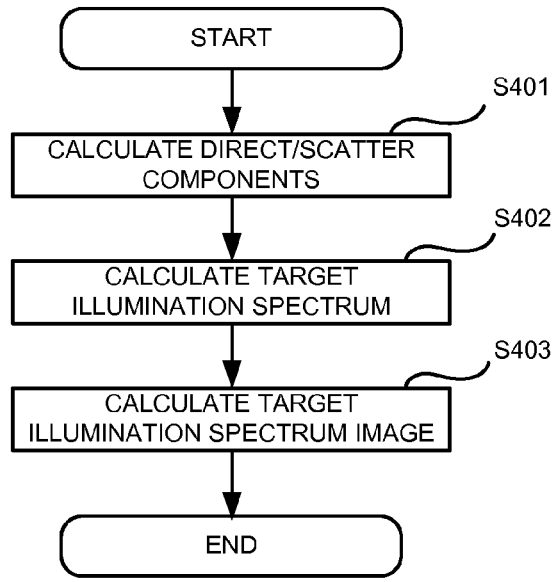
FIG. 11 is a flow chart of the fifth embodiment in accordance with the present invention.

Next, an overall operation of the present embodiment will be described with reference to FIG. 10 and a flow chart in FIG. 11.

The clear-sky illumination spectrum calculating means 35 receives an input of target information on insolation, and outputs direct and scatter components (S401).

The weather-adaptive illumination spectrum calculating means 36 receives an input of target information on weather, and outputs a target illumination spectrum (S402).

The target illumination spectrum image calculating means 51 converts the input spectral reflectance image into an image as captured under arbitrary outdoor illumination using the method according to EQ. (5) based on the target illumination spectrum calculated at the weather-adaptive illumination spectrum calculating means 36, and outputs the resulting image (S403).

As described above, according to the first through fifth embodiments, an image can be corrected so that captured color information can be used as stable information even when the image is captured under a cloudy or shaded environment, as well as under a clear-sky environment. A reason thereof is that an illumination spectrum is estimated with high accuracy by combining a direct component with a scatter component using appropriate weighting factors based on weather information.

Moreover, while several components may be configured in hardware, they also may be implemented by a computer program, as is obvious from the preceding description. In this case, a processor that is operated by programs stored in a program memory implements functions and/or operations similar to those in the aforementioned embodiments. It is also possible to implement part of functions of the aforementioned embodiments by a computer program.

Further, the content of the above-mentioned exemplary embodiments can be expressed as follows.

(Supplementary note 1) A method of estimating an illumination spectrum, comprising: calculating an illumination spectrum based on weather information.

(Supplementary note 2) The method of estimating an illumination spectrum according to Supplementary note 1, comprising:

estimating an illumination spectrum in arbitrary weather by combining a direct component with a scatter component in an illumination spectrum under clear skies calculated according to insolation conditions, using a weighting factor determined based on said weather information.

(Supplementary note 3) The method of estimating an illumination spectrum according to Supplementary note 2, comprising:

in a case that said weather information indicates a shade in which a direct component is blocked by an object, calculating a shape of an illumination spectrum as composed only of scatter components by setting a weighting factor for said direct component to zero.

(Supplementary note 4) The method of estimating an illumination spectrum according to Supplementary note 2 or 3, comprising:

in a case that said weather information indicates clear skies without any block of sunlight by a cloud or an object, calculating an illumination spectrum in which a weighting factor for said direct component and that for said scatter component are set to the same value.

(Supplementary note 5) The method of estimating an illumination spectrum according to any one of Supplementary notes 2 to 4, comprising:

in a case that said weather information indicates cloudiness in which the sun is blocked by clouds, calculating an illumination spectrum in which a weighting factor for said direct component is set to have a value smaller than that for said scatter component according to a degree of cloudiness.

(Supplementary note 6) An image processing method of converting an image captured outdoors in arbitrary date and time, place, and weather into an image as captured under a specified illumination spectrum, comprising:

direct/scatter component calculating step of calculating direct and scatter components in an illumination spectrum under clear skies based on insolation conditions during imaging;

imaging illumination spectrum calculating step of combining said direct component with said scatter component based on information on weather during imaging, and estimating an illumination spectrum in an imaging environment; and illumination spectrum correcting step of converting an input image into an image as under predefined illumination.

(Supplementary note 7) An image processing method of converting an image captured under known illumination into an image as captured outdoors in arbitrary date and time, place, and weather specified by a user, comprising:

direct/scatter component calculating step of calculating direct and scatter components in an illumination spectrum under clear skies based on specified insolation conditions;

target illumination spectrum calculating step of combining said direct component with said scatter component based on the specified weather information, and calculating an illumination spectrum in a target environment; and illumination spectrum correcting step of converting an input image into an image as under illumination in said target environment.

(Supplementary note 8) An image processing method of converting an image captured outdoors in arbitrary date and time, place, and weather into an image as captured outdoors in different arbitrary date and time, place, and weather, comprising:

direct/scatter component calculating step of calculating direct and scatter components in an illumination spectrum under clear skies based on insolation conditions during imaging;

imaging illumination spectrum calculating step of combining said direct component with said scatter component based on information on weather during imaging, and estimating an illumination spectrum in an imaging environment;

direct/scatter component calculating step of calculating direct and scatter components in an illumination spectrum under clear skies based on insolation conditions such as specified date and time and position;

target illumination spectrum calculating step of combining said direct component with said scatter component based on specified weather information, and calculating an illumination spectrum in a target environment; and illumination spectrum correcting step of using the illumination spectrum in said imaging environment to convert an input image into an image as under illumination in said target environment.

(Supplementary note 9) An image processing method of estimating spectral reflectance for an imaged object from an image captured outdoors in arbitrary date and time, place, and weather, comprising:

direct/scatter component calculating step of calculating direct and scatter components in an illumination spectrum under clear skies based on insolation conditions during imaging;

imaging illumination spectrum calculating step of combining said direct component with said scatter component based on information on weather during imaging, and estimating an illumination spectrum in an imaging environment; and spectral reflectance calculating step of removing an effect of the illumination spectrum in said imaging environment from an input image, and estimating spectral reflectance for the imaged object.

(Supplementary note 10) An image processing method of generating an image captured outdoors in arbitrary date and time, place, and weather specified by a user from spectral reflectance data for an imaged object, comprising:

direct/scatter component calculating step of calculating direct and scatter components in an illumination spectrum under clear skies based on specified insolation conditions;

target illumination spectrum calculating step of combining said direct component with said scatter component based on specified weather information, and calculating an illumination spectrum in a target environment; and target spectrum image calculating step of generating an image under illumination in said target environment from the spectral reflectance data for the imaged object.

(Supplementary note 11) An image processing system for converting an image captured outdoors in arbitrary date and time, place, and weather into an image as captured under a specified illumination spectrum, comprising:

direct/scatter component calculating means for calculating direct and scatter components in an illumination spectrum under clear skies based on insolation conditions during imaging;

imaging illumination spectrum calculating means for combining said direct component with said scatter component based on information on weather during imaging, and estimating an illumination spectrum in an imaging environment; and illumination spectrum correcting means for converting an input image into an image as under predefined illumination.

(Supplementary note 12) An image processing system for converting an image captured under known illumination into an image as captured outdoors in arbitrary date and time, place, and weather specified by a user, comprising:

direct/scatter component calculating means for calculating direct and scatter components in an illumination spectrum under clear skies based on specified insolation conditions;

target illumination spectrum calculating means for combining said direct component with said scatter component based on the specified weather information, and calculating an illumination spectrum in a target environment; and illumination spectrum correcting means for converting an input image into an image as under illumination in said target environment.

(Supplementary note 13) An image processing system for converting an image captured outdoors in arbitrary date and time, place, and weather into an image as captured outdoors in different arbitrary date and time, place, and weather, comprising:

direct/scatter component calculating means for calculating direct and scatter components in an illumination spectrum under clear skies based on insolation conditions during imaging;

imaging illumination spectrum calculating means for combining said direct component with said scatter component based on information on weather during imaging, and estimating an illumination spectrum in an imaging environment;

direct/scatter component calculating means for calculating direct and scatter components in an illumination spectrum under clear skies based on insolation conditions such as specified date and time and position;

target illumination spectrum calculating means for combining said direct component with said scatter component based on specified weather information, and calculating an illumination spectrum in a target environment; and illumination spectrum correcting means for converting an input image into an image as under illumination in said target environment by using the illumination spectrum in said imaging environment.

(Supplementary note 14) An image processing system for estimating spectral reflectance for an imaged object from an image captured outdoors in arbitrary date and time, place, and weather, comprising:

direct/scatter component calculating means for calculating direct and scatter components in an illumination spectrum under clear skies based on insolation conditions during imaging;

imaging illumination spectrum calculating means for combining said direct component with said scatter component based on information on weather during imaging, and estimating an illumination spectrum in an imaging environment; and spectral reflectance calculating means for removing an effect of the illumination spectrum in said imaging environment from an input image, and estimating spectral reflectance for the imaged object.

(Supplementary note 15) An image processing system for generating an image captured outdoors in arbitrary date and time, place, and weather specified by a user from spectral reflectance data for an imaged object, comprising:

direct/scatter component calculating means for calculating direct and scatter components in an illumination spectrum under clear skies based on specified insolation conditions;

target illumination spectrum calculating means for combining said direct component with said scatter component based on specified weather information, and calculating an illumination spectrum in a target environment; and target spectrum image calculating means for generating an image under illumination in said target environment from the spectral reflectance data for the imaged object.

(Supplementary note 16) A program of converting an image captured outdoors in arbitrary date and time, place, and weather into an image as captured under a specified illumination spectrum, said program causing an information processing device to execute the processes of:

direct/scatter component calculating processes of calculating direct and scatter components in an illumination spectrum under clear skies based on insolation conditions during imaging;

imaging illumination spectrum calculating processes of combining said direct component with said scatter component based on information on weather during imaging, and estimating an illumination spectrum in an imaging environment; and illumination spectrum correcting processes of converting an input image into an image as under predefined illumination.

(Supplementary note 17) A program of converting an image captured under known illumination into an image as captured outdoors in arbitrary date and time, place, and weather specified by a user, said program causing an information processing device to execute the processes of:

direct/scatter component calculating processes of calculating direct and scatter components in an illumination spectrum under clear skies based on specified insolation conditions;

target illumination spectrum calculating processes of combining said direct component with said scatter component based on the specified weather information, and calculating an illumination spectrum in a target environment; and illumination spectrum correcting processes of converting an input image into an image as under illumination in said target environment.

(Supplementary note 18) A program of converting an image captured outdoors in arbitrary date and time, place, and weather into an image as captured outdoors in different arbitrary date and time, place, and weather, said program causing an information processing device to execute the processes of:

direct/scatter component calculating processes of calculating direct and scatter components in an illumination spectrum under clear skies based on insolation conditions during imaging;

imaging illumination spectrum calculating processes of combining said direct component with said scatter component based on information on weather during imaging, and estimating an illumination spectrum in an imaging environment;

direct/scatter component calculating processes of calculating direct and scatter components in an illumination spectrum under clear skies based on insolation conditions such as specified date and time and position;

target illumination spectrum calculating processes of combining said direct component with said scatter component based on specified weather information, and calculating an illumination spectrum in a target environment; and illumination spectrum correcting processes of using the illumination spectrum in said imaging environment to convert an input image into an image as under illumination in said target environment.

(Supplementary note 19) A program of estimating spectral reflectance for an imaged object from an image captured outdoors in arbitrary date and time, place, and weather, said program causing an information processing device to execute the processes of:

direct/scatter component calculating processes of calculating direct and scatter components in an illumination spectrum under clear skies based on insolation conditions during imaging;

imaging illumination spectrum calculating processes of combining said direct component with said scatter component based on information on weather during imaging, and estimating an illumination spectrum in an imaging environment; and spectral reflectance calculating processes of removing an effect of the illumination spectrum in said imaging environment from an input image, and estimating spectral reflectance for the imaged object.

(Supplementary note 20) A program of generating an image captured outdoors in arbitrary date and time, place, and weather specified by a user from spectral reflectance data for an imaged object, said program causing an information processing device to execute the processes of:

direct/scatter component calculating processes of calculating direct and scatter components in an illumination spectrum under clear skies based on specified insolation conditions; target illumination spectrum calculating processes of combining said direct component with said scatter component based on specified weather information, and calculating an illumination spectrum in a target environment; and target spectrum image calculating processes of generating an image under illumination in said target environment from the spectral reflectance data for the imaged object.

Above, although the present invention has been particularly described with reference to the preferred embodiments, it should be readily apparent to those of ordinary skill in the art that the present invention is not always limited to the above-mentioned embodiments, and changes and modifications in the form and details may be made without departing from the spirit and scope of the invention.

This application is based upon and claims the benefit of priority from Japanese patent application No. 2010-287246, filed on Dec. 24, 2010 the disclosure of which is incorporated herein in its entirety by reference.

INDUSTRIAL APPLICABILITY

The present invention may be applied to video processing apparatuses in which an effect of variation of an insolation spectrum on the shape of an observed spectrum during imaging in the outdoors is corrected.

REFERENCE SIGNS LIST

11 Illumination spectrum correcting means
12 Clear-sky illumination spectrum calculating means
13 Target illumination spectrum storage memory
22 Clear-sky illumination spectrum calculating means
24 Weather-adaptive illumination spectrum calculating means
32 Imaging illumination spectrum storage memory
35 Clear-sky illumination spectrum calculating means
36 Weather-adaptive illumination spectrum calculating means
41 Spectral reflectance image calculating means
51 Target illumination spectrum image calculating means
241 Combination weight calculating means
242 Direct/scatter component combining means

The invention claimed is:

1. A method of calculating an illumination spectrum, implemented by a processor, comprising:
  calculating the illumination spectrum of an input image in arbitrary weather by combining a direct component with a scatter component in an illumination spectrum under clear skies obtained according to insolation conditions, using a weighting factor determined based on weather information, wherein said weather information indicates a degree of cloudiness;
  in a case that said weather information indicates clear skies without any block of sunlight by a cloud or an object, calculating the illumination spectrum by setting the weighting factor for said direct component and the weighting factor for said scatter component to the same value; and
  converting the input image into an output image based on the calculated illumination spectrum.

2. The method of calculating an illumination spectrum according to claim 1, comprising:
  in a case that said weather information indicates a shade in which the direct component is blocked by an object, calculating a shape of the illumination spectrum as composed only of scatter components by setting a weighting factor for said direct component to zero.

3. The method of calculating an illumination spectrum according to claim 1, further comprising:
  in a case that said weather information indicates cloudiness in which the sun is blocked by clouds, calculating the illumination spectrum by setting a weighting factor for said direct component to have a value smaller than a value of a weighting factor for said scatter component according to the degree of cloudiness.

4. An image processing system for converting an input image captured outdoors at an arbitrary date and time, place, and weather into an output image as captured under a specified illumination spectrum, comprising:
  a memory and a processor configured to execute instructions to cause the processor to calculate direct and scatter components in an illumination spectrum under clear skies based on obtained insolation conditions during the imaging, determine a weighting factor based on information on weather obtained during the imaging, calculate an illumination spectrum in an imaging environment by combining said direct component with said scatter component based on said weighting factor, wherein said information on weather indicates a degree of cloudiness, obtain the specified illumination spectrum, and convert the input image into the output image as under a target illumination, based on said calculated illumination spectrum in the imaging environment and said specified illumination spectrum,
  wherein the processor calculates the illumination spectrum by setting the weighting factor for said direct component and the weighting factor for said scatter component to the same value in a case that said information on weather indicates clear skies without any block of sunlight by a cloud or an object.

5. The image processing system according to claim 4,
  wherein said memory and said processor are further configured to execute instructions to cause the processor to calculate the illumination spectrum in arbitrary weather by combining the direct component with the scatter component in the illumination spectrum under clear skies calculated according to the insolation conditions, using the weighting factor determined based on said information on weather.

6. The image processing system according to claim 5,
  wherein said memory and said processor are further configured to execute instructions to cause the processor to calculate a shape of the illumination spectrum as composed only of scatter components by setting a weighting factor for said direct component to zero, in a case that said information on weather indicates a shade in which a direct component is blocked by an object.

7. The image processing system according to claim 5,
  wherein said memory and said processor are further configured to execute instructions to cause the processor to calculate the illumination spectrum by setting a weighting factor for said direct component to have a value smaller than a value of a weighting factor for said scatter component according to a degree of cloudiness, in a case that said information on weather indicates cloudiness in which the sun is blocked by clouds.

8. A method of calculating an illumination spectrum, implemented by a processor, comprising:
  inputting insolation conditions;
  calculating a direct component and a scatter component in an illumination spectrum under clear skies based on said insolation conditions;
  determining a weighting factor based on weather information;
  calculating the illumination spectrum for an output image in arbitrary weather by combining said direct component with said scatter component in the illumination spectrum under clear skies based on said weighting factor, wherein said weather information indicates a degree of cloudiness;
  in a case that said weather information indicates clear skies without any block of sunlight by a cloud or an object, calculating the illumination spectrum by setting the weighting factor for said direct component and the weighting factor for said scatter component to the same value; and converting an input image into the output image based on the calculated illumination spectrum.

9. An image processing system for converting an input image captured under known illumination into an output image as captured outdoors at an arbitrary date and time, place, and weather specified by a user, the image processing system comprising:

a memory and a processor configured to execute instructions to cause the processor to calculate direct and scatter components in an illumination spectrum under clear skies based on specified insolation conditions, determine a weighting factor based on specified information on weather, calculate an illumination spectrum in a target environment by combining said direct component with said scatter component based on said weighting factor, wherein said specified information on weather indicates a degree of cloudiness, obtain an illumination spectrum in an imaging environment, and convert the input image into the output image as under illumination in the target environment, based on said obtained illumination spectrum in the imaging environment and said calculated illumination spectrum in the target environment, wherein the processor calculates the illumination spectrum by setting the weighting factor for said direct component and the weighting factor for said scatter component to the same value in a case that said information on weather indicates clear skies without any block of sunlight by a cloud or an object.

10. An image processing system for converting an input image captured outdoors at an arbitrary date and time, place, and weather into an output image as captured outdoors at a different arbitrary date and time, place, and weather, comprising:

a memory and a processor configured to execute instructions to cause the processor to calculate first direct and scatter components in an illumination spectrum under clear skies based on obtained first insolation conditions during imaging, determine a first weighting factor based on first information on weather obtained during the imaging, calculate a first illumination spectrum in an imaging environment by combining said first direct component with said first scatter component based on said first weighting factor, wherein said first information on weather indicates a degree of cloudiness during the imaging, calculate second direct and scatter components in an illumination spectrum under clear skies based on second insolation conditions at a specified date and time and position, determine a second weighting factor based on specified second information on weather, calculate a second illumination spectrum in a target environment by combining said second direct component with said second scatter component based on said second weighting factor, wherein said second information on weather indicates a degree of cloudiness, and convert the input image into the output image as under illumination in the target environment by using the first illumination spectrum and the second illumination spectrum, wherein the processor calculates the first illumination spectrum by setting the weighting factor for said first direct component and the weighting factor for said first scatter component to the same value in a case that said first information on weather indicates clear skies without any block of sunlight by a cloud or an object, and calculates the second illumination spectrum by setting the weighting factor for said second direct component and the weighting factor for said second scatter component to the same value in a case that said second information on weather indicates clear skies without any block of sunlight by a cloud or an object.

11. An image processing system for calculating spectral reflectance for an imaged object from an input image captured outdoors at an arbitrary date and time, place, and weather, comprising:

a memory and a processor configured to execute instructions to cause the processor to calculate direct and scatter components in an illumination spectrum under clear skies based on obtained insolation conditions during imaging, determine a weighting factor based on information on weather obtained during the imaging, calculate an illumination spectrum in an imaging environment by combining said direct component with said scatter component based on said weighting factor, wherein said information on weather indicates a degree of cloudiness during the imaging, and convert the input image into a spectral reflectance image by removing an effect of the calculated illumination spectrum in the imaging environment from the input image, wherein the processor calculates the illumination spectrum by setting the weighting factor for said direct component and the weighting factor for said scatter component to the same value in a case that said information on weather indicates clear skies without any block of sunlight by a cloud or an object.

12. An image processing system for generating an output image captured outdoors at an arbitrary date and time, place, and weather specified by a user from an input spectral reflectance data for an imaged object, comprising:

a memory and a processor configured to execute instructions to cause the processor to calculate direct and scatter components in an illumination spectrum under clear skies based on specified insolation conditions, determine a weighting factor based on specified information on weather, calculate an illumination spectrum in a target environment by combining said direct component with said scatter component based on said weighting factor, wherein said specified information on weather indicates a degree of cloudiness, and generate the output image under illumination in the target environment from the input spectral reflectance data for the imaged object, wherein the processor calculates the illumination spectrum by setting the weighting factor for said direct component and the weighting factor for said scatter component to the same value in a case that said information on weather indicates clear skies without any block of sunlight by a cloud or an object.

* * * * *